Figure 15:
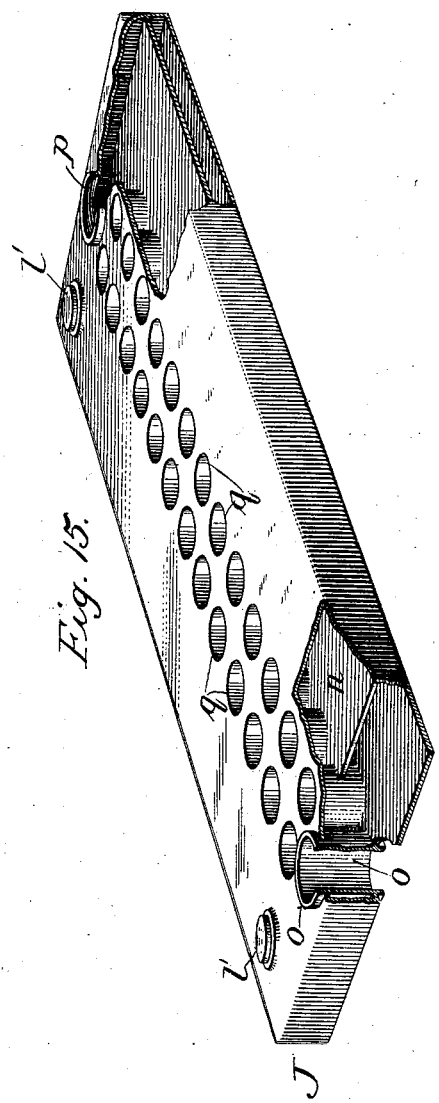

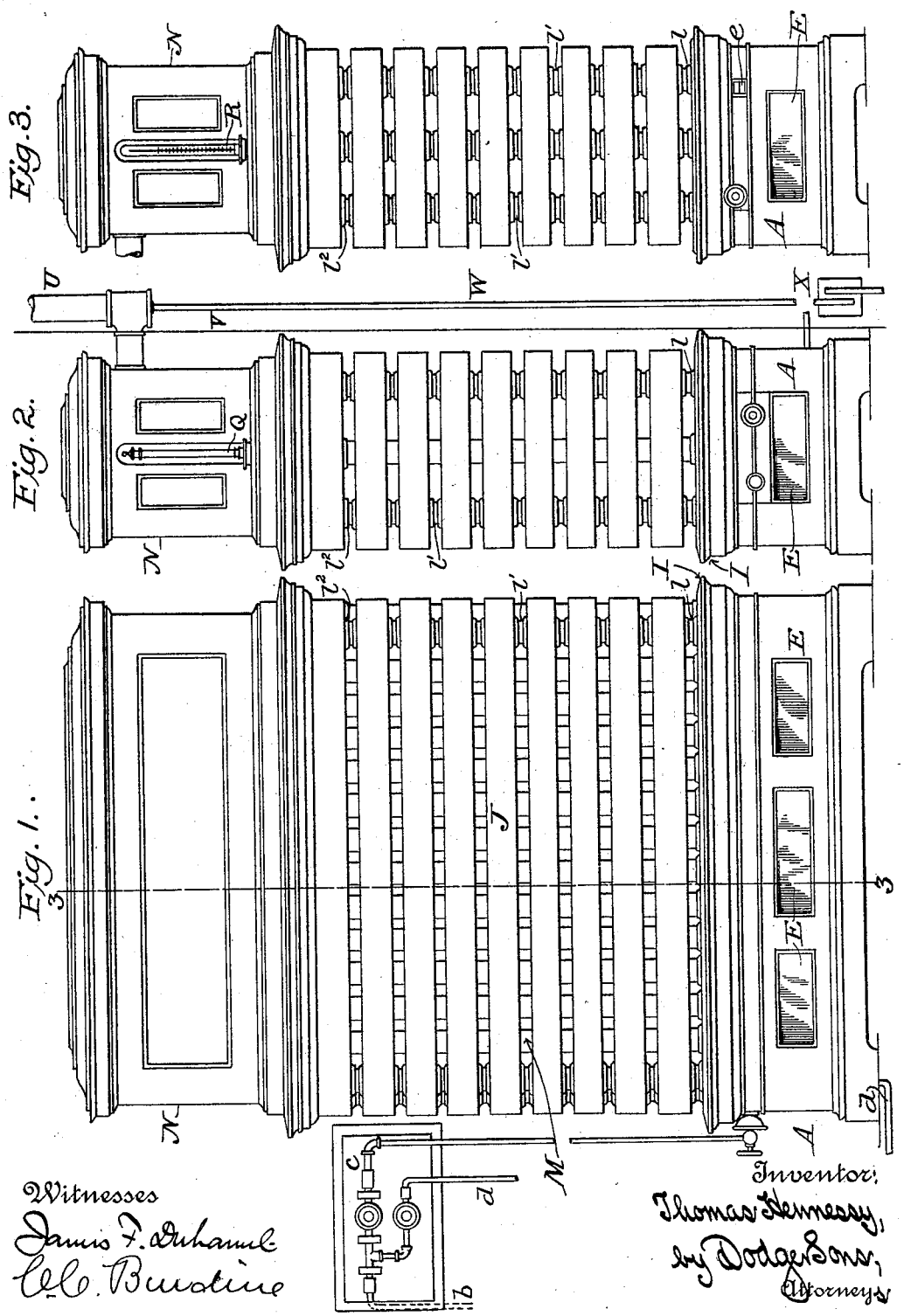

No. 606,717. Patented July 5, 1898.
T. HENNESSY.
HEATING AND VENTILATING SYSTEM.
(Application filed July 14, 1896. Renewed Apr. 27, 1898.)
(No Model.) 5 Sheets—Sheet 2.
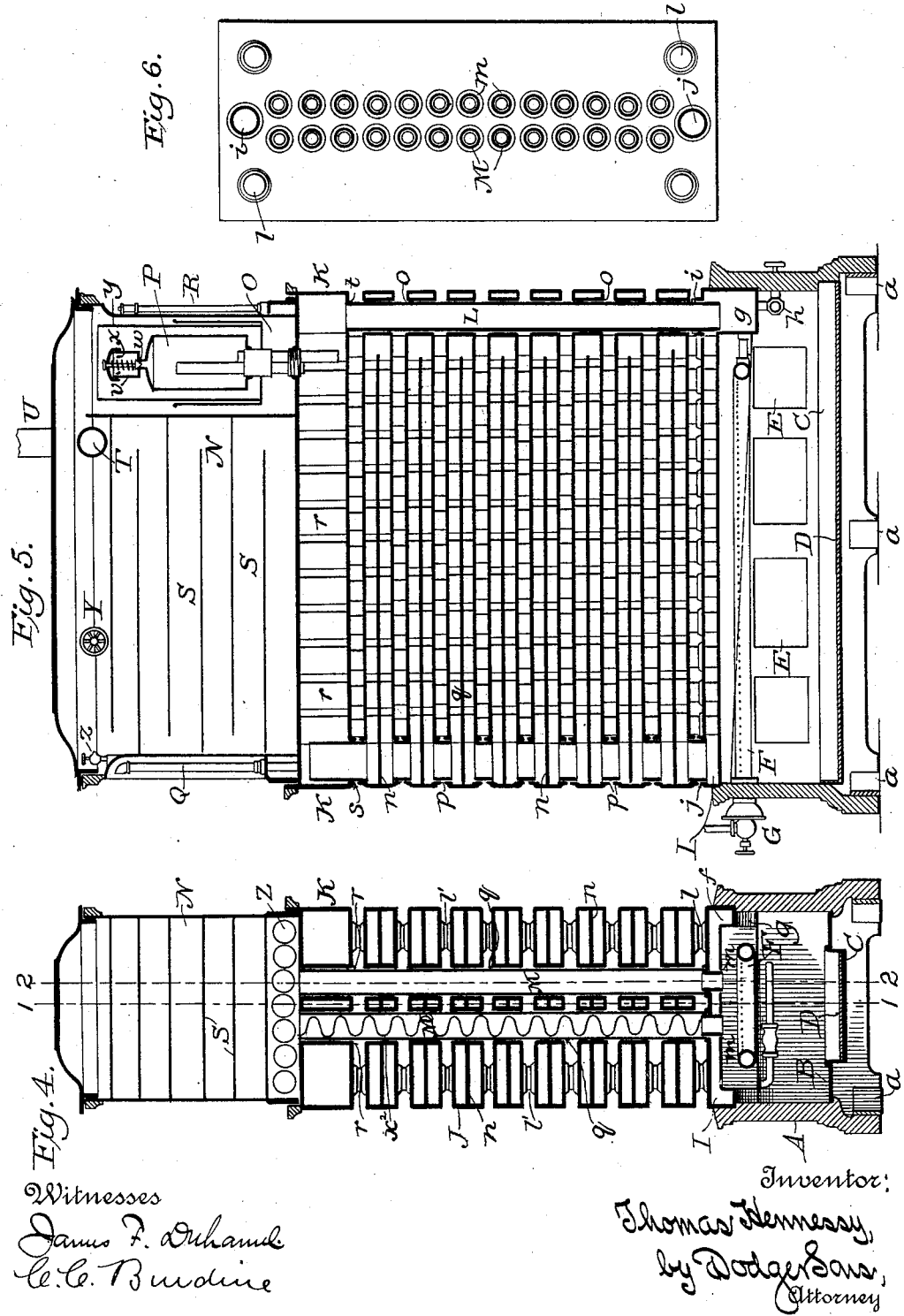

No. 606,717. Patented July 5, 1898.
T. HENNESSY.
HEATING AND VENTILATING SYSTEM.
(Application filed July 14, 1896. Renewed Apr. 27, 1898.)
(No Model.) 5 Sheets—Sheet 3.
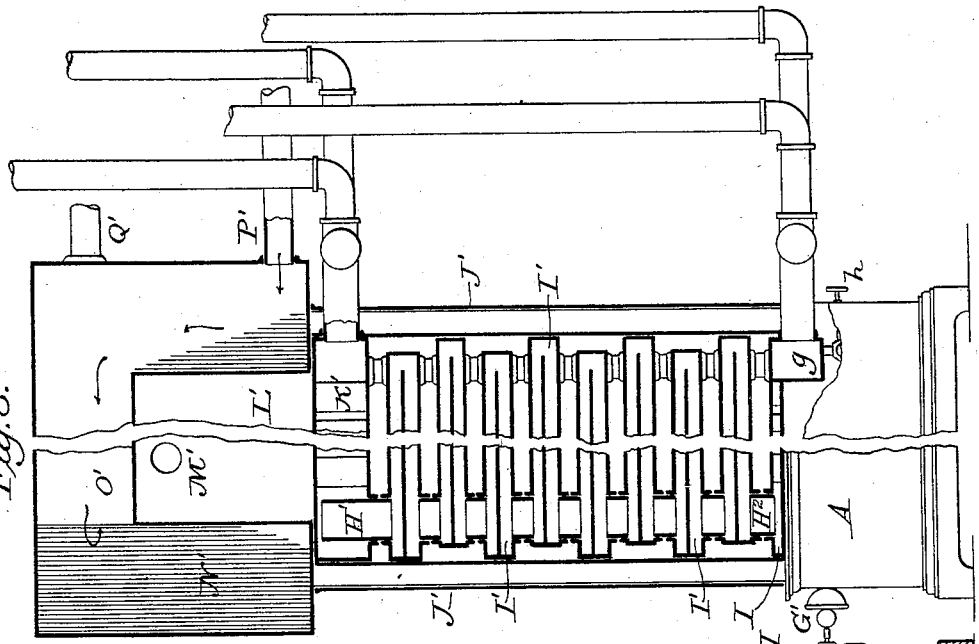
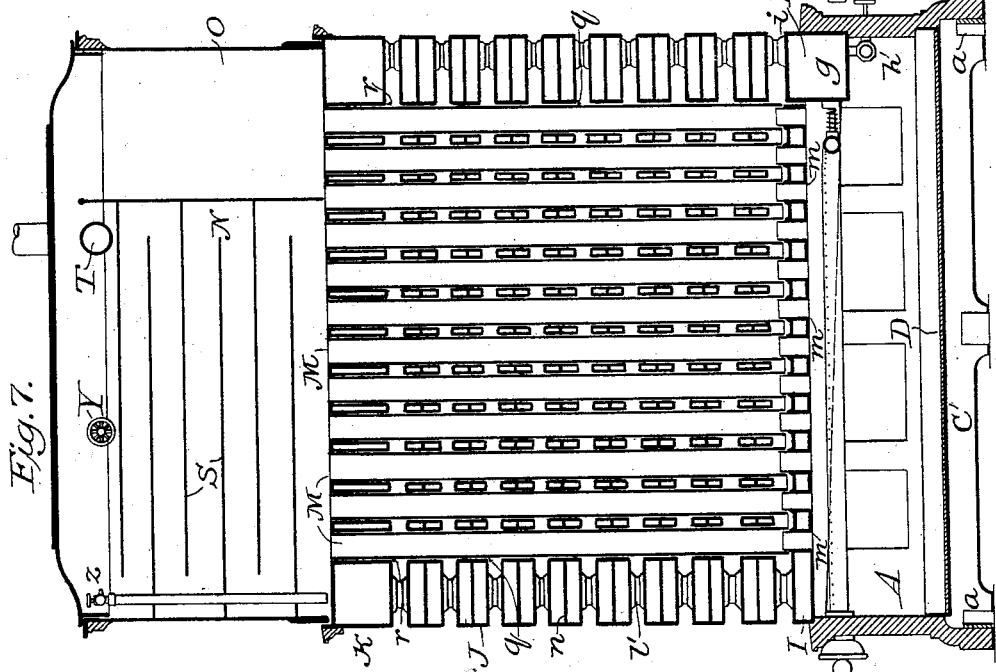

No. 606,717. Patented July 5, 1898.
T. HENNESSY.
HEATING AND VENTILATING SYSTEM.
(Application filed July 14, 1896. Renewed Apr. 27, 1898.)
(No Model.) 5 Sheets—Sheet 4.
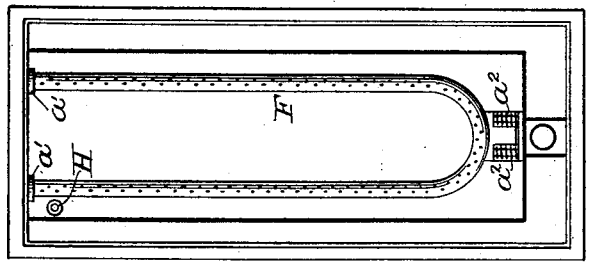
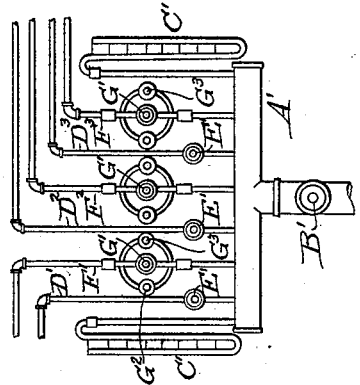
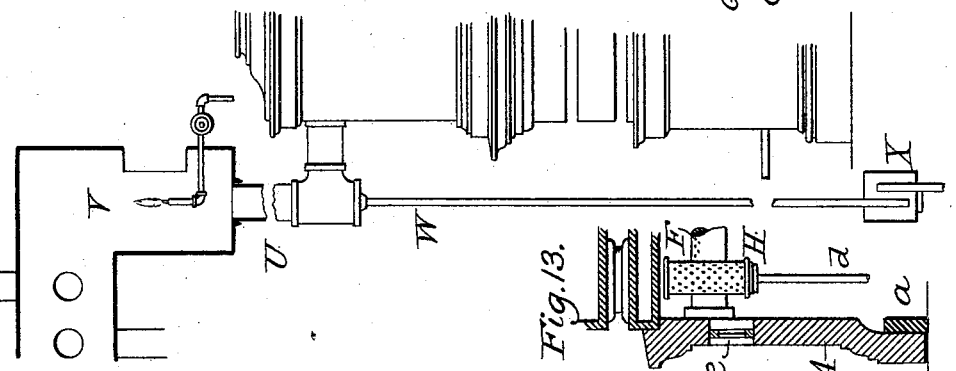
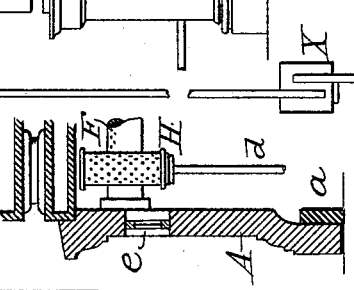
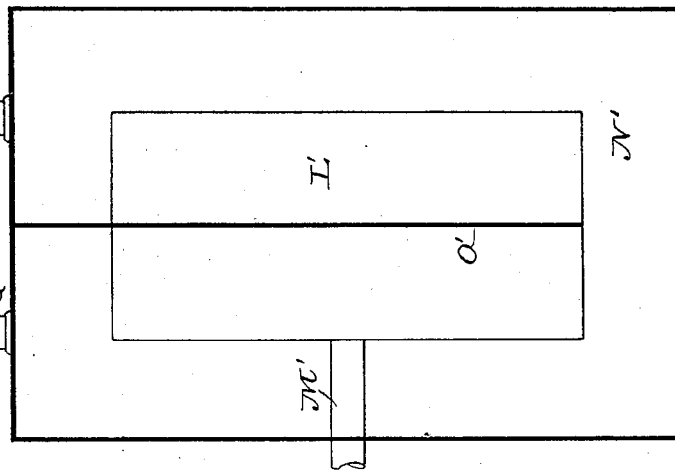
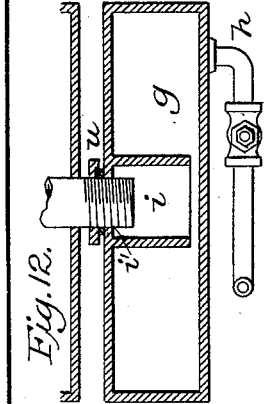
Witnesses
James F. Duhamel
C. C. Bindine
Inventor:
Thomas Hennessy,
by Dodge Sons
Attorneys.
THE NORRIS PETERS CO., PHOTO-LITHO., WASHINGTON, D. C.

No. 606,717. Patented July 5, 1898.
T. HENNESSY.
HEATING AND VENTILATING SYSTEM.
(Application filed July 14, 1896. Renewed Apr. 27, 1898.)
(No Model.) 5 Sheets—Sheet 5.

Witnesses
Ce.C. Burdine.
D.E. Burdine.

Inventor:
Thomas Hennessy,
by Dodge and Son,
Attorneys.

UNITED STATES PATENT OFFICE.

THOMAS HENNESSY, OF EXCELSIOR SPRINGS, MISSOURI, ASSIGNOR TO THE AMERICAN INCANDESCENT GAS COMPANY, OF KANSAS CITY, MISSOURI.

HEATING AND VENTILATING SYSTEM.

SPECIFICATION forming part of Letters Patent No. 606,717, dated July 5, 1898.

Application filed July 14, 1896. Renewed April 27, 1898. Serial No. 679,047. (No model.)

*To all whom it may concern:*

Be it known that I, THOMAS HENNESSY, a citizen of the United States, residing at Excelsior Springs, in the county of Clay and State of Missouri, have invented certain new and useful Improvements in Heating and Ventilating Systems, of which the following is a specification.

My invention relates to an improved heating and ventilating system embodying the use of gas as a heating medium and of air and water to absorb and distribute the heat.

In the annexed drawings, Figure 1 is a side elevation of one of the radiators; Figs. 2 and 3, elevations of the opposite ends thereof; Fig. 4, a transverse vertical section on the line 3 3 of Fig. 1; Fig. 5, a longitudinal vertical section on the line 1 1 of Fig. 4; Fig. 6, a top plan view of one of the radiator-sections; Fig. 7, a longitudinal vertical section on the line 2 2 of Fig. 4; Fig. 8, a transverse sectional view of a modified form of apparatus; Fig. 9, a sectional view of the upper portion of the heater shown in Fig. 8; Fig. 10, a side elevation, partly in section, showing the connection of the radiator or heater with the vent-pipe; Figs. 11, 12, and 13, views illustrating details of construction; Fig. 14, a plan view of the manifold and connections for supplying the system of radiators or heaters with gas; and Fig. 15, a perspective view, partly broken away, of one of the intermediate sections of the radiator.

One object of the present invention is to employ a system of radiators throughout the different rooms or portions of a building and so connect them with a source of supply of gas that they may all be regulated from a common point.

Another object is to make a combined hot-air and hot-water radiator in which gas is used as the heating agent.

A still further object of the invention is to simplify the construction of the radiator-sections, so that they may be readily assembled.

Many other points of novelty are involved and will be pointed out hereinafter.

I will first describe one of the radiators. It comprises a base A, preferably made in sections, so that it may be readily taken apart and easily handled. Around the lower edge of the base, at the corners and upon the inside thereof, are secured rubber feet or supports $a$, upon which the radiator rests. This prevents direct transmission of heat from the radiator to the floor or other support upon which the radiator rests. A removable grating or grid B is mounted within the lower part of the base, which in turn supports a pan C. The bottom of this pan is provided with a reflector D, and the side walls of the base are formed with a series of transparent panes E.

F indicates the burner, also mounted within the base, extending from one end to the other thereof and back again. It is provided with a valve connection G, located outside the base, said valve and connection being of the Bunsen type to insure a proper admixture of air. As will be seen upon reference to Fig. 11, the ends of the burner are provided with collars $a'$, while bearing against the opposite end of the burner and the end of the casing is a spring $a^2$, said spring tending at all times to hold the collars against the opposite end frame and keep the burner in place.

Near one end of the base and adjacent to the main burner is a second burner or pilot-light H. (Best shown in Fig. 13.) The burner under the construction employed is surrounded by a cylinder of perforate metal, and the flame is intended to burn constantly therein. Separate connections are made to the main from the burner and the pilot-light. Such a connection is shown in Fig. 1, in which $b$ is the main, $c$ the valved connection leading to the burner, and $d$ the valved connection leading to the pilot-light. The connections and valves may be placed in a recess in the wall, and a removable cover provided therefor, such an adaptation being shown in Fig. 1 with the cover removed. A slide $e$ will be provided in that end of the base next to the pilot-light in order that it may be ignited in the first instance. When once lighted, it is designed to remain so, and when the gas is turned on in the burner said gas will pass through the perforations and become ignited without any act upon the part of the attendant other than turning on the supply through pipe $c$.

To ascertain if the gas is properly ignited, all that is necessary is to glance down through the openings or windows E onto the reflector D, where the burner will be reflected.

Upon the base A is mounted a hot-water radiator of peculiar construction, while surmounting said radiator is a hot-air chamber.

I will first describe the construction of the radiator. It comprises a series of sections, all of which are similar in form except the bottom and top ones. The lowermost section L is designed to fit within the upper part of the base and rest thereon. Its formation will be best seen upon reference to Figs. 4, 5, 7, and 12. It consists of a flat oblong box-like structure having depending sides $f$, inclining slightly toward a downdrop $g$ at one end, said section $g$ being provided with a valved draw-off $h$. Extending downwardly into the space $g$ and preferably formed integral with the upper face of the section is a thimble or collar $i$, a threaded opening $i'$ being provided in the upper face of the section in line with said collar. At the opposite end of the section is formed a threaded opening $j$. To each side of the openings in the end of the section are formed knobs or projections $l$, which are designed to fit or bear against similar parts formed on the other sections. The sections when in place are directly connected at one end only and that at simply one point, so there would be a tendency for the sections to droop or rock and to either break the connections or make them leak. This is obviated, and when the sections are assembled they rest firmly one upon the other. A series of openings $m$, formed on both sides of the medial line of the section, extend vertically therethrough from side to side.

J denotes one of the intermediate or central sections. (Shown in detail in Fig. 15.) It is formed with a division-plate or diaphragm $n$, extending horizontally from one end nearly to the other and from side to side. A vertical opening $o$ is formed at one end in line with the opening $i'$, formed in the lower section at its deep end. This opening extends through the section, but has no communication with the interior thereof. A threaded opening $p$ is formed in both faces opposite each other at the other end of the section, said openings being in line with the opening $j$, formed in the lower section. A series of vertical openings or passages $q$, similar to the openings $m$, with which they register, are formed in the section. This section is also provided with projections $l'$, similar to the projections $l$ of the lower section. All of the intermediate sections are the same.

K indicates the upper or top section. It is formed with a series of vertical passages $r$, which correspond to the openings $m$ and $q$; also, with a threaded opening $s$, corresponding to the opening $p$, and a threaded opening $t$ in line with the vertical openings $o$ and the threaded opening $i'$.

The sections are assembled as follows: A threaded nipple is entered in the opening $j$ of section I and in the threaded opening $p$ of one of the sections J. The sections are then turned until drawn up tight, when the projections or knobs $l$ and $l'$ abut and maintain the sections in proper relation. As many intermediate sections J are screwed on as may be found necessary or desired, when the top section is screwed in place, its downwardly-projecting knobs $l^2$ bearing against the projections $l'$. Connection is made between the opening $t$ of the upper section and the opening $l^2$ of the lower section through a pipe L. This pipe is provided at its upper end with a thread of standard length, while the lower end is formed with a thread of twice such length. Before the upper section is placed in position the pipe is dropped down through the openings $o$, a collar $u$ screwed upon its end, and it is then screwed down into the opening $i'$, so that the upper end of said pipe is below the normal position of the upper section. When said section is in place, the pipe L is screwed up into the opening $t$ until it is tight. The collar $u$ is then screwed down upon a packing interposed between it and the lower section, forming a tight joint. It will thus be seen that the sections may be quickly assembled in a very simple manner. Having a nipple connection at but one end, there is no trouble in screwing the sections together, and under the construction as shown and described a positive circulation is secured. As the water is heated it will pass out of the shallow end of the lower section into the section above. The collar $i$ at the lower end of the pipe L forms a trap which prevents the heated water from flowing up through said pipe. The water passes from one end of the sections J to the opposite end beneath the diaphragm $n$, thence back again above the diaphragm and into the section above. This continues until the heated water reaches the upper section, where, as it becomes cooled, it flows down the pipe L to the lower section.

It will be noticed upon reference to Fig. 5 that the nipple connecting the upper section and that below it extends well up into said section, and consequently discharges the hot water into the upper portion thereof. This also aids in maintaining the proper circulation.

A series of tubes M are passed down through the openings $r$ and $q$ and rest over the openings $m$, forming air-passages between the base and an upper air chamber or receiver N. This chamber is formed with a space O at one end for the reception of an expansion device P, connected with the upper section K. This device comprises a chamber $v$, provided with an adjustable spring-valve $w$ at its upper end and with a series of openings $x$ around the cup of the valve, through which the water or steam may escape when the pressure becomes so high as to unseat the valve. The chamber $v$ is surrounded by a receptacle $y$, adapted to receive any water that may be expelled, where it will be held and evaporated. The connection between the upper section and the chamber $v$ is such that a constant circulation is maintained between said parts.

An air-vent $z$ is connected with the upper section, and said section has also connected to it a water-gage Q and a combined thermometer and pressure-gage R.

The chamber or receiver N is formed with a series of horizontal partitions S, extending from opposite sides thereof, which cause the air to pass back and forth therethrough until it finally reaches an exit T, communicating with a vent-pipe U. The upper end of this pipe is connected with a main flue V, adapted to receive the heated air or products of combustion from a number of radiators. A small flame is kept burning in the flue to induce a constant and proper circulation of air. To the lower end of the pipe U is connected a drain W, communicating with a trap X or with the pan beneath the burner. This drain carries off any water which may accumulate in the vent-pipe.

Y denotes a damper located above the top partition or diaphragm in the chamber or receiver N, and when so desired the heated air may be discharged therefrom directly into the chamber.

When it is desired to have access to the upper section K, the chamber or receiver N may be bodily lifted therefrom by simply disconnecting the pipe U from the back thereof. A number of openings Z are made in the case of the portion between the main body of the chamber and the chamber or space O, so that the air entering said latter chamber may pass therefrom into the chamber N beneath the lowermost diaphragm or partition.

Where the above-described radiators are employed throughout a house as the means of heating, it may be desirable to have the control of their operation centralized. Especially is this so in a hotel or other compartment-house, and when so used the regulating device will be preferably employed in connection with an electric or other signaling device to indicate when the room is occupied and heat desired. To provide proper means for such control, I employ a manifold A', connected directly with the main supply-pipe B', as shown in Fig. 14. To both ends of the manifold are secured siphons C' to indicate the pressure, or in their place other pressure-indicating devices may be employed. Extending from the manifold is a series of pipes D', $D^2$, and $D^3$, each of which leads to a radiator and to the pilot-light located therein. All of said pipes are provided with a valve E'. Also connected with the manifold is a second series of pipes F', $F^2$, and $F^3$, preferably alternating with the pipes D', $D^2$, and $D^3$. This second series forms the supply system for the burners. To properly regulate the flow of gas, each of the supply-pipes is provided with a main valve G' and two by-pass valves $G^2$ and $G^3$. When the temperature is mild or a low degree of heat only is required, but one of the by-pass valves will be opened. When more is desired, the second by-pass will be opened, or both by-pass valves closed and the main valve G' used, or the main valve and either or both of the by-passes may be employed. It will thus be seen that each and every radiator may be separately controlled from one central point, and where proper signaling or indicating devices are employed in connection with the manifold all waste of gas and unnecessary heating are done away with.

In Figs. 8 and 9 I have shown a somewhat-modified form of radiator designed more especially for indirect heating. The construction of the base and radiator-sections is essentially the same as has been already described. Instead, however, of employing a pipe to connect the upper and lower sections directly manifolds H' $H^2$ are connected to the upper and lower sections, respectively, and from which extend pipes connecting to different radiators throughout the building.

As will be seen upon reference to Fig. 8, the radiator-sections I' are not provided with any vertical openings and are so arranged and connected that they form a tortuous passage between the walls J', by which they are inclosed. This causes the air that is drawn in beneath the base and through the vertical openings in the lower section to travel back and forth between the sections, finally passing up through opening K', formed in the upper section, into a chamber L', thence to a discharge-outlet M', connected with a chimney.

To utilize the heat which may be in the air and products of combustion, I form over and around said chamber L' a second chamber N'. A vertical partition O' extends from one end of this chamber nearly to the other. Communicating with the chamber N' near its base and to one side of the partition is a pipe P' designed to supply the chamber with cool fresh air, which air becomes heated as it passes through the chamber around the partition and is finally discharged into a pipe Q', located on the opposite side of the partition and near the top of the chamber. This pipe leads to any point desired.

It is of course to be understood that the openings in the various sections through which the pipes M pass are of such a diameter that a space is left between the walls of the opening and the face of the pipe. This permits the air to pass up around the pipes from section to section. In Fig. 4 I have shown one of the pipes M provided with a strip of sheet metal $x^2$, bent back and forth upon itself to cause retardation of the air in its passage through said pipes.

Having thus described my invention, what I claim is—

1. As a new article of manufacture, a radiator-section having openings near one end on opposite faces; a diaphragm extending from that end from side to side approximately to the opposite end; and a series of passages extending directly through the sides and the diaphragm.

2. A radiator comprising a series of sections communicating with each other at one end and having its outer sections directly connected at its opposite end, diaphragms in said sections, substantially as described; and a series of pipes extending through the sections and forming air-passages, substantially as described.

3. A radiator comprising a series of sections directly connected at one end by a series of short nipples, and having the upper and lower sections connected directly at the opposite end by a pipe screwed into the upper section and extending into the lower section, the lower end of said pipe being provided with a long thread, and a collar mounted thereon, as and for the purposes set forth.

4. In combination with the base and its burner; a hot-water radiator mounted thereon comprising a series of connected sections; passages extending through said sections one above the other; a series of pipes mounted in said passages and communicating with the base and its burner; and a chamber mounted upon the top of the radiator in direct communication with the upper ends of said pipes, whereby the products of combustion are confined, substantially as described.

5. In combination with the base and its burner; a hot-water radiator mounted thereon comprising a series of connected sections; passages extending through said sections one above another; a series of pipes of an external diameter smaller than said openings and mounted therein, said pipes communicating with the base; and a chamber mounted upon the top of the radiator in direct communication with the upper ends of the pipes, whereby the products of combustion are confined and air is permitted to pass up and around the entire exterior of the pipes.

6. A hot-water radiator comprising a series of sections directly connected at one end; a pipe L connecting the outer sections at the opposite end; a collar $i$ formed integral with the lower section and extending toward the bottom thereof, whereby a trap is formed for the lower end of the connecting-pipe.

7. In a radiator, the combination of the base provided with air-passages extending therethrough; a series of sections mounted upon said base, and also provided with openings in line with the passages in the base; and a series of tubes passing down through the openings in the sections and resting upon the base.

8. In a radiator, the combination of the base provided with air-passages extending therethrough; rings or collars formed around said air-passages; a series of sections mounted upon said base, and also provided with openings in line with the passages in the base; and a series of tubes passing down through said openings in the sections and resting upon the base around the rings or collars.

9. In combination with the base and its burner; a radiator-section mounted thereon having depending sides $f$ inclining down from one end to the other, and a downdrop $g$ at the lower end of said depending sides; a series of sections mounted on said bottom section and connected thereto; and a top section connected to said intermediate sections and also directly connected with the downdrop.

In witness whereof I hereunto set my hand in the presence of two witnesses.

THOMAS HENNESSY.

Witnesses:
  GEO. E. CONGAN,
  W. R. THURMOND.